US006505171B1

(12) United States Patent
Cohen et al.

(10) Patent No.: US 6,505,171 B1
(45) Date of Patent: Jan. 7, 2003

(54) SYSTEM AND METHOD FOR HANDLING PURCHASING TRANSACTIONS OVER A COMPUTER NETWORK

(76) Inventors: Robert H. Cohen, 623 N. Cresent Heights Blvd., Los Angeles, CA (US) 90048; Jeffrey Charles Marder, 316 San Vicente Blvd., Santa Monica, CA (US) 90402-1642; John Clayton Hilinski, 41101-101 Via Candidiz, San Diego, CA (US) 92130

( * ) Notice: Subject to any disclaimer, the term of this patent is extended or adjusted under 35 U.S.C. 154(b) by 0 days.

(21) Appl. No.: 09/498,063

(22) Filed: Feb. 4, 2000

(51) Int. Cl.[7] .............................. G06F 17/60; G06K 7/00
(52) U.S. Cl. ......................................... 705/26; 235/380
(58) Field of Search ............................. 705/26, 27, 44, 705/67, 77, 78; 235/380

(56) References Cited

U.S. PATENT DOCUMENTS

| 5,637,845 A | * | 6/1997 | Kolls .......................... 235/381 |
| 5,781,632 A | | 7/1998 | Odom ....................... 705/26 X |
| 5,809,144 A | | 9/1998 | Sirbu et al. ............... 705/26 X |
| 5,826,241 A | | 10/1998 | Stein et al. .................... 705/26 |
| 5,845,260 A | * | 12/1998 | Nakano et al. ............... 705/26 |
| 5,864,829 A | * | 1/1999 | Tago ............................. 705/39 |
| 5,890,137 A | | 3/1999 | Koreeda ....................... 705/26 |
| 5,895,454 A | | 4/1999 | Harrington ................... 705/26 |
| 5,903,652 A | | 5/1999 | Mital ........................ 705/26 X |
| 5,903,878 A | | 5/1999 | Talati et al. .................. 705/26 |
| 5,913,203 A | | 6/1999 | Wong et al. ................... 705/39 |
| 5,915,093 A | | 6/1999 | Berlin et al. |
| 5,926,798 A | | 7/1999 | Carter .......................... 705/26 |
| 5,940,807 A | | 8/1999 | Purcell ......................... 705/26 |
| 6,047,269 A | * | 4/2000 | Biffar ........................... 705/39 |
| 6,125,352 A | * | 9/2000 | Franklin et al. .............. 705/26 |

FOREIGN PATENT DOCUMENTS

WO    WO96/25012    *    8/1996

OTHER PUBLICATIONS

Pertinent Web pages from website address www.cybermoola.com Printed Sep. 23, 1999.
Pertinent Web pages from website address www.theprepaidcard.com Printed Sep. 21, 1999.

* cited by examiner

Primary Examiner—F. J. Bartuska
(74) Attorney, Agent, or Firm—Fulwider Patton Lee & Utecht

(57) ABSTRACT

A system and method for handling purchasing transactions over a computer network using pre-paid cards as the medium of exchange between a purchaser and a merchant. Selection of salable items on a merchant's display site by the purchaser is followed by activation of a purchasing option which triggers a third party processor to substitute an alternative display substantially duplicating the merchant's sales presentation such that the merchant's display features remain in the view of the purchaser while the transaction is being authorized. Notification of the transaction is dependent upon the outcome to preserve valuable system resources.

4 Claims, 8 Drawing Sheets

| USER RECORD 44 FOR UNIQUE USER IDENTIFIER 80 |
|---|
| UNIQUE CARD IDENTIFIER 38 |
| INITIAL BALANCE 61 |
| PASSWORD 81 |
| SHIPPING ADDRESS 82 |
| NAME 82a |
| ADDRESS 82b |
| CITY 82c |
| STATE OR PROVINCE 82d |
| ZIP 82e |
| COUNTRY 82f |
| DAYTIME TELEPHONE 82g |
| EMAIL ADDRESS 82h |
| CURRENT BALANCE 65 |
| CARD STATUS (INACTIVE/ACTIVE) |

FIG. 4

TRANSACTION ACCOUNT RECORD

| TRANSACTION DATE | REFERENCE NUMBER 92 | MERCHANT ID 33 | ITEM 48 | COST 78 |
|---|---|---|---|---|
| 09/01/99 | IOY876 | MERCHANT A | SHIRT | $14.00 |
| 08/30/99 | PKL551 | MERCHANT B | PIZZA | $9.99 |
| 08/26/99 | DMP886 | MERCHANT C | MONTHLY ACCESS | $19.99 |
| 07/25/99 | CCX432 | MERCHANT D | SUNGLASSES | $79.99 |
| 07/22/99 | POP677 | MERCHANT E | MOVIE TICKETS | $15.00 |

| CARD ID 38 | CURRENT BALANCE 65 |
|---|---|
| IZC5698IY54 | $46.32 |

FIG. 5

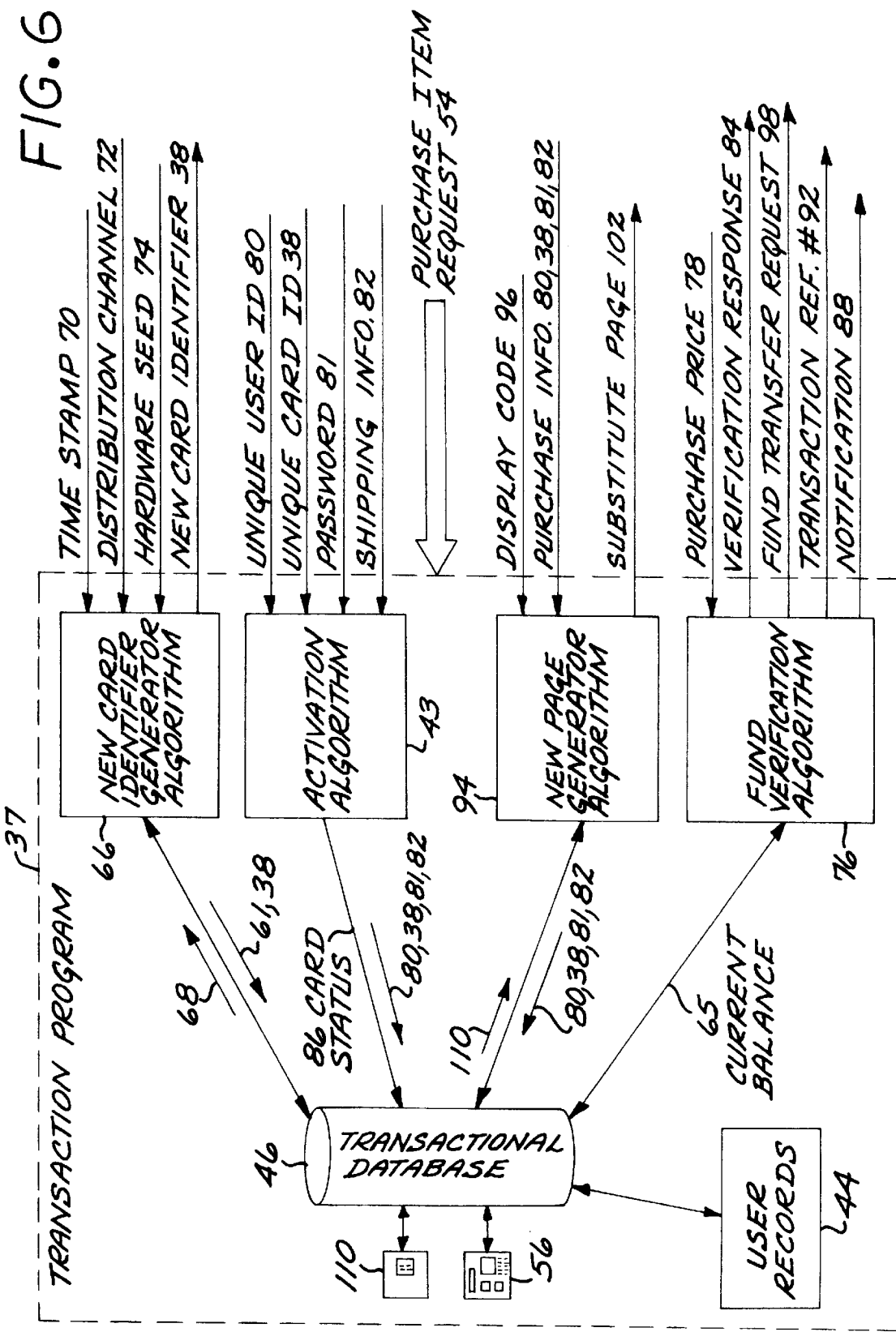

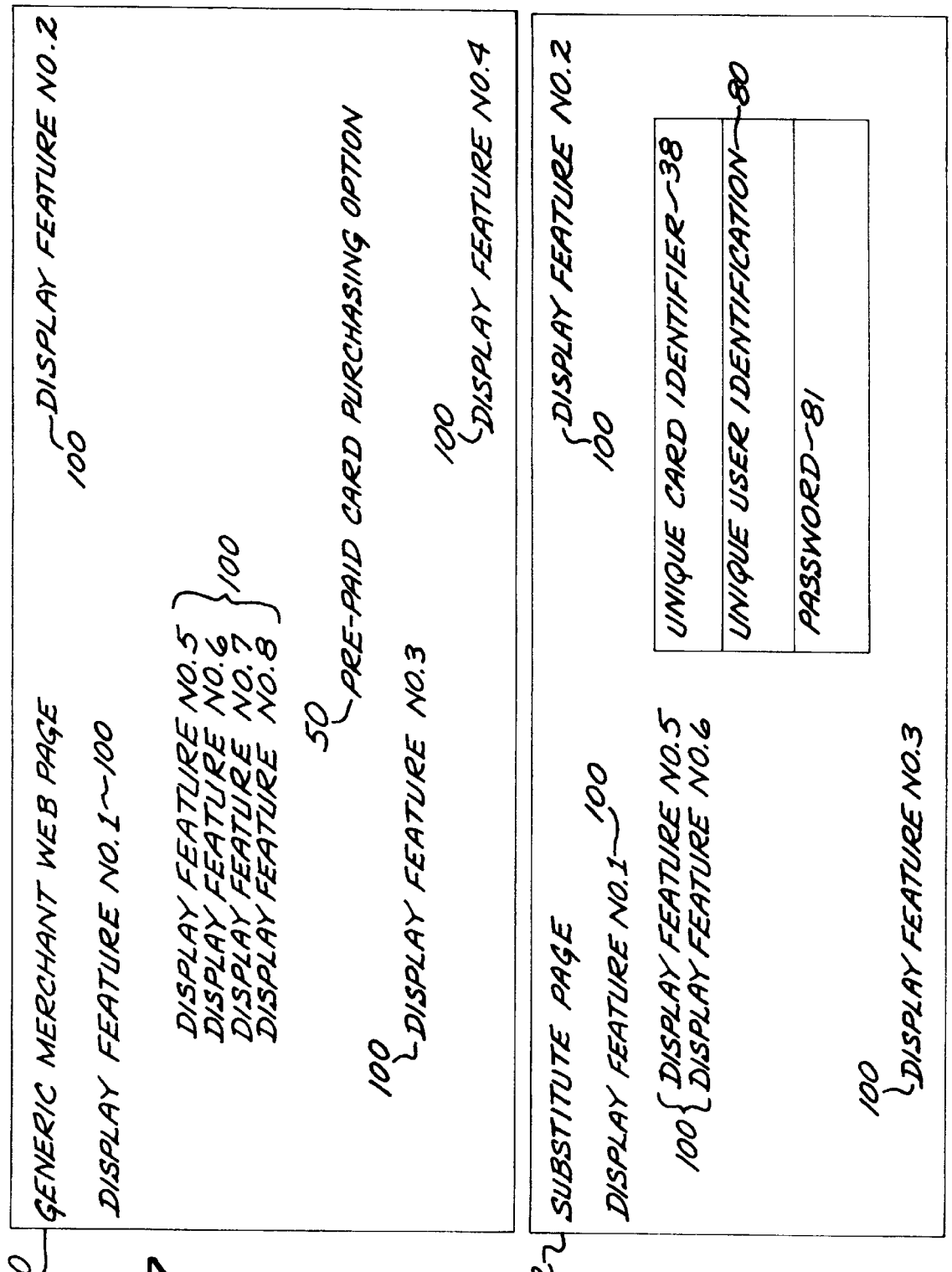

UNIQUE USER IDENTIFIER: —80
UNQUE CARD IDENTIFIER: —38
PASSWORD: —81
CONFIRM PASSWORD: —81
SHIPPING INFORMATION: —82
NAME: —82a
ADDRESS: —82b
CITY: —82c
STATE OR PROVINCE: —82d
ZIP/POSTAL CODE: —82e
COUNTRY: —82f
DAYTIME TELEPHONE: —82g
EMAIL ADDRESS: —82h

SUBMIT

FIG. 9

SYSTEM AND METHOD FOR HANDLING PURCHASING TRANSACTIONS OVER A COMPUTER NETWORK

BACKGROUND OF THE INVENTION

1. Field of the Invention

The invention relates generally to transactional systems and methods and more specifically to systems and methods for purchasing goods and or services over a global computer network.

2. Description of the Prior Art

As more and more consumers gain access to the World Wide Web or Internet, the prospect of the sale of goods and or services over the Internet continues to urge businesses to set up a network presence to support their customer base and attract new customers. Many larger businesses are moving toward providing an on-line presence to supply additional information and services to their customers at their customers' convenience, to reduce costs, and to remain competitive in the marketplace. Smaller businesses are likewise attracted to the Internet to expand and attract a larger customer base and reduce operating costs.

The on-line presence established by such business merchants is typically a home page simulating a store front displaying the merchant's logos or other design features that set that particular merchant apart from others. Other information such as advertised items and contact information also adorn the page. Additional web pages are generally provided if necessary to convey additional information. Merchants also typically sell or rent unused space on their web page to other piggybacking advertisers to help with costs of maintaining both the web site and the business. In accordance with preferred advertising practices, continued exposure of the consumer to such displays is of paramount importance.

Purchasing items over the Internet involves the selection of salable items on the merchant's web site after browsing or searching the contents of the related web pages until the desired item is found. The item is then selected and typically placed into an on-line shopping cart which holds the items while the purchaser continues to shop. Other items may be selected and placed into the cart in a similar manner. When the purchaser desires to buy the items previously selected, he or she selects an icon associated with a checkout process. This brings up a screen displaying the shopping cart items and requesting that the purchaser confirm the previous selections. Upon confirmation of the selected items, another screen is displayed which includes a form requesting information such as shipping and billing information including a method of payment. The medium of exchange relied upon by the merchants for Internet sales is almost exclusively limited to credit cards and debit cards.

After completing the form including credit card selection and corresponding information, the consumer submits the information which causes one of two situations to occur. In one instance, the current display remains in view while the credit card information is being processed in the background. In such case, the merchant remains in communication with the validation agency awaiting confirmation of the transaction. On the other occasion, the display page is changed to reflect the creditor's site which removes the merchant's display and associated advertising from the view of the consumer.

Several drawbacks are apparent in the current transactional systems and processes. First of all, the almost exclusive use of credit based transactions removes a large pool of potential customers from purchasing over the Internet. Since many advertisers largely focus on today's youth due to their increased spending means, it would be useful to provide a medium of exchange independent of credit based transactions available to such patrons. Also, not everyone has the luxury of an established credit line or even desires to rely on credit. Another drawback occurs in the first situation wherein the merchant remains in communication with validation authority until the transaction is verified. If the transaction is not viable, then valuable time and resources are wasted by occupying the merchant's server during verification of an eventually invalid transaction. It would therefore be advantageous to provide a system and process that relieves the merchant from the verification process and only contacts the merchant if a transaction is viable due to sufficient funds.

A pre-paid account or pre-paid card would address the drawbacks of prior systems and would provide both benefits to the merchant by increasing the potential customer base and consumers as well. Consumers benefit by preventing credit card fraud, purchasing cards only as necessary, and living debt free. Purchases can remain relatively anonymous as in ordinary cash transactions and no interest accrues on the purchases keeping overall cost to the consumer down.

Additionally, the low cost of Internet access and obtaining information is primarily driven by advertising. Both the merchants and associated advertisers have a vested interest in presenting their ads in the customer's view as long as possible. Therefore, any time when advertising is not being viewed the value of the advertising effectively decreases. Thus, in the second instance when the consumer is sent to an alternate network location and the merchant's display is replaced with the creditor's display, valuable advertising time is lost.

Yet another drawback is the requirement that the consumer provide shipping information every time the merchant site is visited and a purchase is desired. Typically, upon selection of the goods or services, a form with a shipping order is transmitted to the purchaser to fill out. This is performed using the merchant's computer resources which may increase the demand on the server. A system which removes the process of filling out shipping information to an alternate server unburdens the demands on the merchant's server freeing valuable resources.

What is needed, and heretofore unavailable, is a convenient system capable of verifying the viability of a purchasing transaction conducted over a computer network which reduces the merchant's resource requirements while maximizing the viewing time of the merchant's display and a method of using the same.

SUMMARY OF THE INVENTION

In accordance with a preferred embodiment of the present invention, a transactional system is provided for handling a purchasing transaction between a first party and a second party having at least a part of the transaction handled by an administrative third party to relieve some of the resource burden placed on the second party, typically a merchant. Such system generally includes a medium of exchange between the parties in the form of pre-paid cards having unique card identifiers provided in an unactivated format at convenient distribution sites. The cards may be activated at an activation site enabling the first party to begin a purchasing transaction. A global computer network provides the primary communication medium between the parties which have a presence on the network in the form of their respective processors and network addresses. The first party may view the public contents of the second party processor and make a selection of the desired items. A purchasing option with an embedded link is provided in the second party's display and is programmed to, upon activation, transfer handling of the purchasing transaction to a third party processor which sends a substitute display substantially duplicating the second party's display and requests information from the first party. Such third party processor receives the first party information and processes it using a transactional computer program and associated transactional database to verify the viability of such transaction. Notification of the fund verification is provided depending upon the outcome of the verification step.

Further provided are methods for using such system. One method may be applied to credit and non-credit based transactions. Such method includes steps of accessing a second party display on the global computer network and selecting a salable item along with a purchasing option. Selection of the purchasing option triggers an alternate server to send a preformatted display to a first party substantially duplicating the second party display and requesting information from a first party. Receipt of such first party response activates a computer program which accesses a transactional database to authorize the transaction. A successful transaction results in funds being transferred to a second party repository and portions of the first party response sent to the second party for completing the transaction.

Another method using the system of the present invention involves the steps of providing a pre-paid card distribution site capable of issuing pre-paid cards with unique card identifiers in exchange for currency. An accounting database is maintained for monitoring the balance associated with each card. A first network server provides a merchant site having a display page with a predetermined format advertising salable items and offering a pre-paid card purchasing option with a link. Activation of such link transfers administration of the transaction to a second network server which substitutes an alternate display substantially duplicating the merchant site display page and submits a form requesting purchaser information including the unique card identifier. The purchaser information is received and processed by the second network server which accesses the accounting database to verify an adequate account balance and to authorize the transaction. Funds are transferred from the pre-paid card account to the merchant account if the transaction is authorized. Additionally, the purchase information is forwarded from the second network server to the first (merchant) server.

Such system may also incorporate other features such as card to card balance transfers and recharging a pre-paid card.

BRIEF DESCRIPTION OF THE DRAWINGS

FIG. 4 is a block diagram illustrating the contents of a user record;

FIG. 5 is an exemplary illustration of a user account record;

FIG. 6 is a block diagram illustrating the components of a transactional computer program;

FIG. 7 is an exemplary screen of a typical merchant's display site;

FIG. 8 is an exemplary screen of a substituted screen received after selecting a purchasing option;

FIG. 9 is an exemplary screen of an activation site; and

Numerous advantages and aspects of the invention will be apparent to those skilled in the art upon consideration of the following detailed description and attached drawing figures referenced therein.

DETAILED DESCRIPTION OF THE PREFERRED EMBODIMENT

Figure 1:
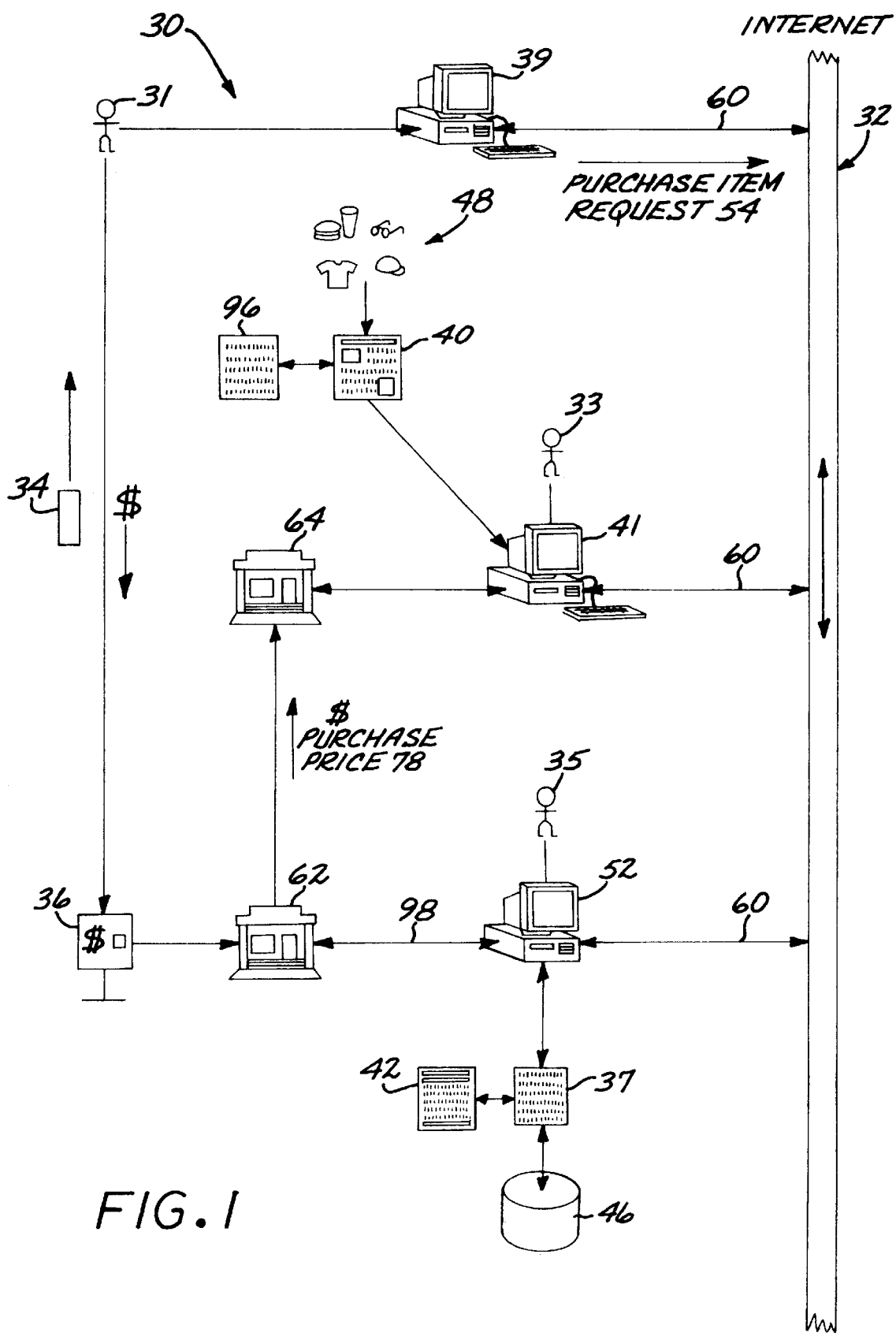
FIG. 1 is a schematic drawing depicting a transactional system in accordance with a preferred embodiment of the present invention.

Referring now to FIG. 1, a transaction system, generally designated 30, for handling purchasing transactions between a first party 31, typically a consumer, and a second party 33, typically a merchant, over a global computer network 32 such as the Internet is provided in accordance with a preferred embodiment of the present invention. The purchasing transactions are processed by a third party administrator 35. A trio of computers including a consumer computer 39, a merchant computer 41, and an administrative computer 52 ensures each party maintains or has access to a presence on the network which serves as the communication medium between the parties. A plurality of pre-paid cards 34, which are generated by the third party administrator 35 and maintained at a distribution site 36, facilitate the purchasing transaction by providing a medium of exchange between the three parties. At least part of the transaction is processed by the third party administrator 35 who maintains and operates a transactional computer program 37 for processing consumer and merchant related information and stores such information in a transactional database 46. The merchant computer 41 contains the contents of a merchant's display site 40 subject to display on the consumer computer 39 upon receipt of an information request. A pre-paid card purchasing option 50 is provided within such display site 40. Selection of the purchasing option 50 transfers the consumer 31 to the administrative computer 52 which generates a preformatted display page 102 (FIG. 8) substantially duplicating the merchant's display and handles the fund verification portion of the transaction. An administrative repository 62 and a merchant repository 64 further handle the transfer of funds between the parties. The components of such system 30 will now be described in more detail.

Figure 3:
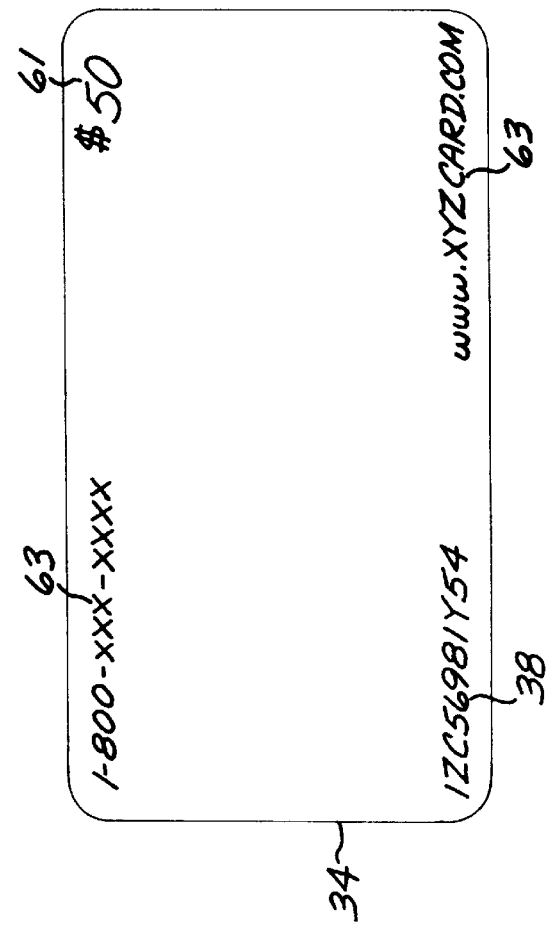
FIG. 3 is an exemplary drawing of a pre-paid card.

With reference now to FIG. 3, for the convenience of the consumer, especially those without access to credit, at least one pre-paid card 34 is generated by the third party administrator 35 to facilitate the purchasing transaction. Each pre-paid card 34 is generated with its own unique card identifier 38. In practice, a sufficient supply of such pre-paid cards are generated to keep up with consumer demand. The pre-paid cards 34 are constructed of any suitable material, although plastics or laminated cards are preferred for their light weight quality, ease of manufacture, and relatively low cost. The cards will typically be rectangularly shaped and the size of a conventional credit card to take advantage of currently used technology. However, the storing and distributing mechanisms in the distribution site 36 will primarily dictate the shape of the card. While a plastic or laminated card provides a convenient medium to store the printed unique card identifier 38, there is no requirement that the card be inserted anywhere or read by a machine. Consequently, in the accordance with the present invention, it is only necessary to provide a unique card identifier 38 in exchange for currency. Thus, a printed receipt or other suitable medium may be satisfactory.

Figure 2:
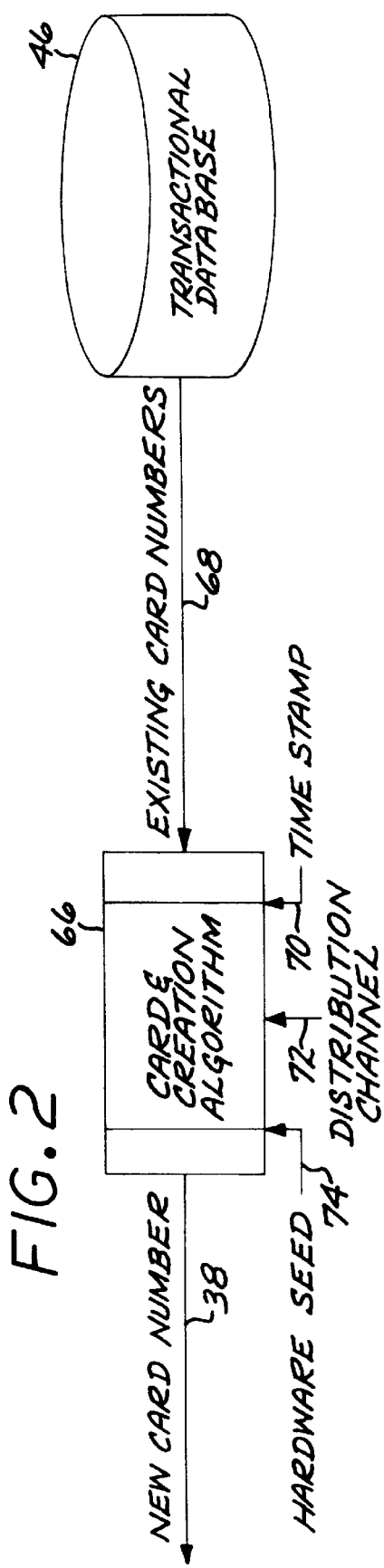
FIG. 2 is a schematic diagram of a unique card identifier generator algorithm.

As illustrated in FIG. 2, the generation of new random card identifiers 38 is performed by a card number creation algorithm 66 included in the transactional computer program 37 maintained by the transactional server 52. Such algorithm receives four inputs to generate the random new card identifier 38: existing card identifiers 68 stored in the transactional database 46 to prevent duplication, a time stamp 70, a distribution channel 72, and a hardware seed 74. The distribution channel provides information relating to the point of sale. The hardware seed is generally a preselected serial number or other set of alphanumeric characters combined with the other inputs to generate a new random unique card identifier 38 such that obvious sequencing is avoided. Such resulting unique card identifier is typically a string of alphanumeric characters or any other indicia that can be transferred over the global computer network 32. The transactional database 46 stores each new card identifier 38 as they are generated and associates each new identifier with an associated initial card balance 61.

Referring back to FIG. 3, each pre-paid card 34 includes a new unique card identifier 38 printed, burned, or otherwise imparted onto the card. For convenience, the initial balance 61 is indicated on the card. Each pre-paid card 34 also includes the necessary contact information 63 such as an "800" number or web address to activate such card. Other information such as advertising may also be displayed on each card. The simplicity of printing a unique card number 38 on each card avoids the expensive technology associated with so-called Smart cards which typically include a chip or magnetic strip embedded in the card surface to record information. Such cards require a device that can read the cards and decipher the information and may be subject to information loss due to magnetic fluctuations.

Referring now to FIG. 1, the pre-paid cards 34 are initially loaded into pre-paid card distributors 36. Such pre-paid card distributors store the pre-paid cards 34 until they are distributed in exchange for currency. A kiosk or vending machine, such as those used to distribute pre-paid calling cards, may be used as a distribution site 36. Such a kiosk is constructed to preferably hold a sufficient number of pre-paid cards to reduce frequent refilling of the distribution site. The kiosks are preferably maintained in convenient locations such as retail or wholesale stores, around college campuses, airports, bus terminals, banks, and the like. It is preferred that the distribution site be constructed to receive currency such as 100, 50, 20, 10, 5, and 1 dollar bills and be able to exchange a card 34 having an initial balance 61 equal to the currency deposited in the distribution site. Alternatively, the pre-paid card may be obtained directly from a dedicated card dealer. When the card is first purchased, it has a card status 86 initially set in an inactive state (FIG. 4). Such inactive card status 86 is stored in the transactional database 46 along with the unique card number 38 and initial balance 61. At this point, the card is not associated with any particular consumer 31. The card status must be changed from an inactive state to an active state prior to use.

The pre-paid cards 34 are activated at an activation site 42, provided by the third party administrator 35, which is preferably a website accessible on the network 32 (FIGS. 1 and 9). Such activation site includes an active server page (ASP) generated by an activation algorithm 43 maintained on the administrative computer 52. Such activation site ASP 42 provides a form requesting consumer related information including a unique user identifier 80, any associated unique card identifiers 38, a password 81, and any preferred shipping information 82. The activation algorithm 43 of the transactional computer program 37 receives such consumer inputs and establishes a user record 44 (FIG. 4) within the accounting database 46. As illustrated in FIG. 4, in addition to these user inputs, a user record 44 for a particular unique user identification 80 includes a current balance 65 which is initially set to the initial balance 61 associated with the particular unique card identifier 38. The user record also includes a card status 86 for each card which is set to active upon completion of the activation sequence. Alternatively the pre-paid card 34 may be activated via an "800" number wherein the consumer related information is provided directly to an operator or through automated touch tone systems.

With continued reference to FIG. 1, the network 32 included in the transaction system 30 generally consists of three basic hardware elements to facilitate communication between the first 31, second 33, and administrative 35 parties. First, a plurality of processors are provided. Among these processors are host servers for storing content and communication and transactional software applications for processing the purchasing transaction. Other processors are client computers loaded with communication software and a network browser allowing parties to request data, software, or services from the host servers. In the context of the present invention, such client computers allow the consumer to access information from the merchant server such as salable items 48 and associated purchasing price. Data transfer infrastructure 60 such as conventional communication lines, wireless communications, and other conventionally used information transporters through which information is carried is also provided. This infrastructure allows the parties to connect with an Internet Service Provider (ISP) and communicate with one another over the network. Routers provide the third basic element and direct the information to other routers and hosts through the communication lines. The hosts and routers are typically computers selected with sufficient capacity to handle the required network tasking. The host computers typically maintain the respective web sites and handle data and file transfer requests. Each host has a unique address on the network and the preferred communication protocol used is TCP/IP. While the present invention could be applied to smaller scale networks and intranets, LAN's and the like, it is primarily directed to large scale e-commerce as facilitated by the Internet which includes thousands of merchants with established shopping sites and accompanying displays.

With reference to FIG. 1, in the present invention, at least three specific hosts are needed which are respectively a consumer host 39, a merchant host 41, and an administrative host 52. The first party consumer host or computer 39 acts typically acts as a client which generally requests data or files from the merchant host maintained by the second party 33. The client computer 39 typically includes a conventional web browser and communication software and hardware enabling the consumer to access the global computer network 32 and request file transfers from other servers for display on a consumer terminal.

The merchant host 41 acts as a server supplying the requested information to the consumer client 39. The merchant host maintains a web site 40 which is a series of related web pages including a home page, which is typically the first page displayed on the consumer terminal after accessing the merchant server, along with other pages which offer salable items 48 such as goods or services for sale. Such web pages are typically written in a display code 96 such as HTML which contains the information readable by the consumer browser to generate the display. Other suitable display codes may also be used. In conventional web sites, typically a series of interactive graphical user interfaces guides the consumer through a selection process and, upon confirmation of such selection, continues guiding the consumer through a purchasing sequence of interactive pages. Ultimately, the merchant host 41 prompts the consumer to select one of several forms of payment for the selected items 48. Information is requested from the consumer including shipping and billing addresses, method of payment, credit card numbers, expiration dates, and other pertinent payment information. Conventionally this done via a credit card transaction using Secure Sockets Layer (SSL) technology to perform a secure transaction.

While such interactive pages may be present in the web pages of the present system, there is also included a purchasing option 50 for using the pre-paid card 34 (FIG. 7) selectable by the consumer. Such pre-paid option is associated with a link containing the network address of the third host 52 or administrative server. This link may be activated by selecting it on screen or may be activated in conjunction with another button such as a submit button. With continued reference to FIG. 7, the merchant's web page 40 includes several display features as indicated as Display Feature Nos. 1–8 (DFN1–8) collectively designated as 100. Such display features DFN1–8 100 include graphical representations associated with the merchant or the merchant web site and are generated by the display code 96. Such graphical features are representative of an actual in store experience including any proprietary indicia, advertising, logos, specially designed web page features, contact information, and other graphical features that set the merchant apart from other merchants. Frequently, merchants will also sell space on their web pages for piggybacked advertising to drive costs down. In accordance with advertising practices, merchants and piggybacking advertisers prefer that a consumer or first party 31 view this information as long as possible. Consequently, interrupted viewing time is a concern to both the merchant and the piggybacking advertiser as they seek to create a lasting impression on the viewer.

The third host is an administrative server 52 that communicates with the consumer host 39 and merchant host 41. Such administrative server is preferably a host computer sufficiently powerful to generate new card identifiers 38, maintain an activation web site 42, generate and store preformatted displays 102, communicate with other network servers and a fund repository 62, verify the viability of a purchasing transaction, and maintain at least one transactional database 46 capable of storing a plurality of user records 44. The transactional database includes accounting capabilities such as maintaining a current balance 65 based on the initial balance 61 and any subsequent purchasing transactions. The administrative or transactional server is loaded with the transactional computer program 37 which includes a number of algorithms and associated databases for performing these tasks. Such algorithms include a new card identifier algorithm 66, an activation algorithm 43, a fund verification algorithm 76, and a new page generator algorithm 94 (FIG. 6). It must be appreciated that conventional programming techniques may be used to develop the program 37. The administrative server 52 is in continuous communication with the network 32 awaiting a signal from any consumer client 39 or associated merchant server 41. In other words, the administrative server is connected to the network and capable of performing at least data storage, file transfer, and data processing functions and provides this information and other services to such affiliated merchant servers 41 and consumer clients 39.

Still referencing FIG. 6, the various components of the transactional computer program 37 are shown. One such component is the new card identifier algorithm 66 discussed above. The administrative server may also maintain the activation site 42 on the network. Consequently, the program 37 also includes the activation algorithm 43 to receive consumer inputs including a unique user identifier 80, any associated unique card identifiers 38, a password 81, and any preferred shipping information 82 to establish a user record 44 (FIG. 4) within the transactional database 46. The primary data structure of the transactional computer program 37 is the accounting database 46 which keeps track of the user records 44, purchasing transactions, and current balances 65 for each unique card identifier 38. An exemplary purchasing transaction log maintained by such database is illustrated in FIG. 5.

With continued reference to FIG. 6, the transactional program 37 of the present invention also includes a new page generator algorithm 94. Such algorithm is designed to obtain the display code 96 of the merchant display page 40, select at least one of the associated display features 100 and generate a substitute page 102 which substantially duplicates the merchant's display page. The code may be obtained by merely requesting a download of the merchant display page to the administrative server from the consumer client 39 or merchant server 41 where the display code 96 may then be revealed by conventional techniques. The new page generator algorithm 94 is also responsible for adding the query window 110 to the substitute page 102 which is an active server page programmed to receive input from the consumer 31. The query form or window 110 requests and receives purchaser information such as the unique card identifier 38, unique user identification 80, and may ask for shipping information 82 if not already on file or send previously stored shipping information and ask if any modification is necessary. This new page generator algorithm 94 receives such input and forwards it to a fund verification algorithm 76.

Per agreement with the merchant, the display code could be rewritten and a copy stored by the administrative server 52 prior to any transactions to speed up the process. In this case, the transaction server 52 would substitute a pre-stored page 56 (FIG. 6) resembling the exemplary page illustrated in FIG. 8 for the merchant's display page 40 upon activation of the pre-paid purchasing option 50.

Further provided in the transactional computer program 37 is the fund verification algorithm 76 which receives inputs from the merchant's and consumer's computers during the purchasing sequence to verify a viable transaction. The find verification algorithm receives inputs from the merchant web site 40 including the purchase price 78 of the selected salable items 48 (FIG. 1). Other items such as those used to generate the account record including an item description and merchant identifiers illustrated in FIG. 5 may also be requested. The fund verification algorithm accesses the transactional database 46 to retrieve the current balance 65 maintained on the card 34 being used. A comparison is made to generate a verification response 84 which may take two forms (FIG. 6). A positive response indicates that there is a sufficient card balance to cover the requested purchase price. A negative response indicates that there is an insufficient card balance to cover the purchase price and thus the transaction can not be completed. Depending upon the verification response, notification 88 of the outcome is routed to both the consumer 31 and merchant 33 in the case of a positive response or just the consumer in case of a negative response. Such algorithm also generates a transaction reference number 92 to assist any subsequent review of the transaction and customer service.

Referring again to FIG. 1, a necessary part of the system 30 is a pair of financial repositories for holding and transferring any funds associated with the transaction. The first repository 62 provides an account for the third party administrator 35 or pre-paid card sponsor. As the currency deposited at the distribution sites 36 is collected, it is deposited into the account in the first repository and maintained there until subsequent transfer to a second repository 64, which includes the merchant's account. While both repositories may be the same financial institution, it is likely that the merchants maintain their accounts in other banks or financial institutions. The first repository is in communication with the administrative server 52 and receives input from the fund verification algorithm 76 of the transaction program 37. The input received includes fund transfer request 98 authorizing release of funds to the proper merchant account. Such communication takes place over secure lines or through using any suitable secure technology as is known in the networking industry. Actual transfer of the funds between the first and second repositories is accomplished using traditional banking techniques. It will be appreciated that the first repository 62 could also perform the third party administrator 35 operations and maintain the transactional computer program 37 and transactional database 46.

A detailed purchasing process using the above described system 30 will now be described. While certain features of the following invention may be applied to credit card based transactions that dominate the Internet, the following will be discussed in the context of a pre-paid card 34 based transaction providing the advantages enumerated herein. In general terms, the process involves the preliminary steps of card generation, card acquisition, and card activation. These preliminary steps are followed by selection of the salable item 48 for purchase while the bulk of the process involves the actual purchasing transaction including verification of the funds and subsequent transfer.

Figure 10A:
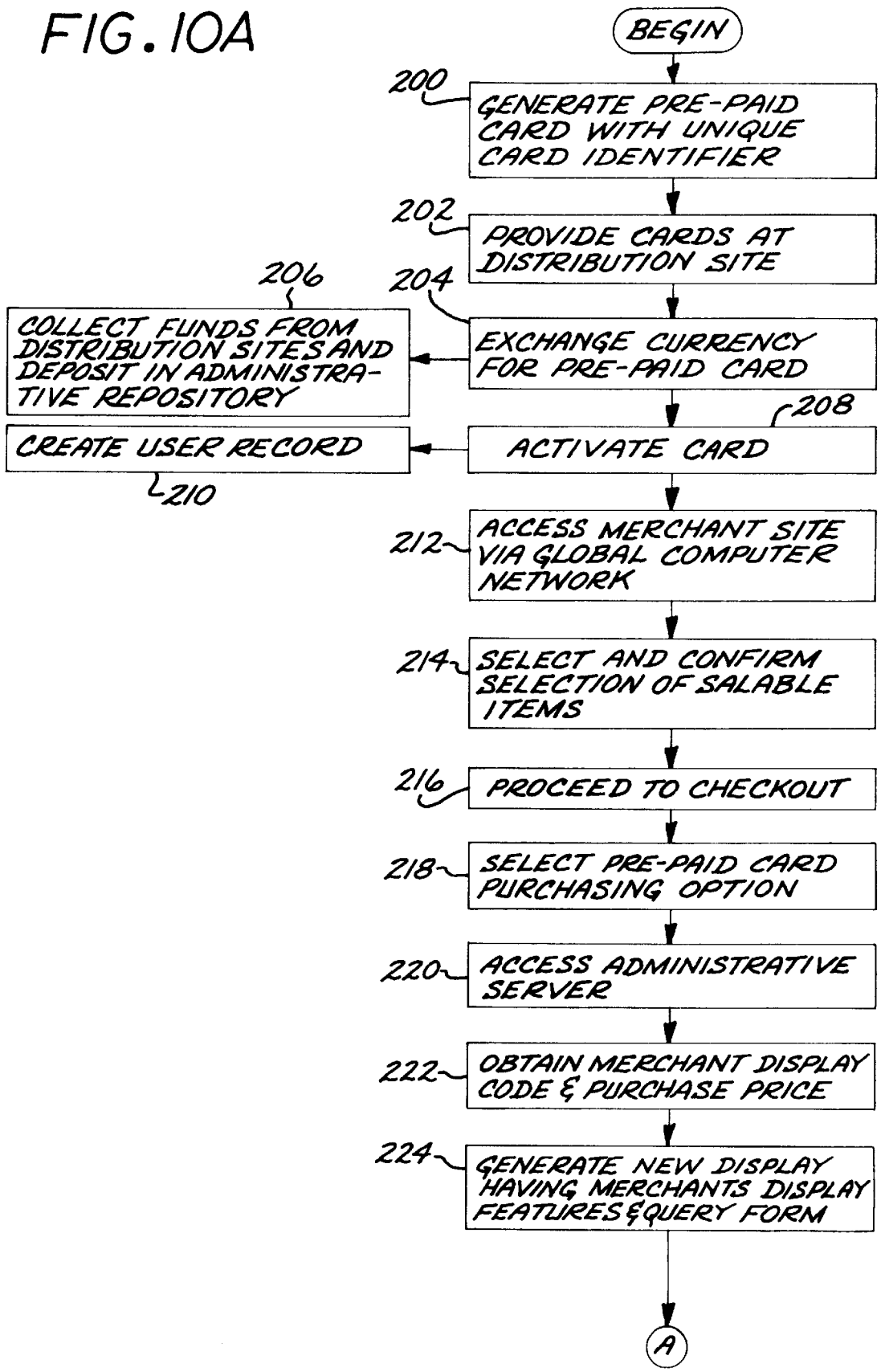
FIGS. 10A and 10B depict a flow diagram illustrating the process of the present invention.
Figure 10B:
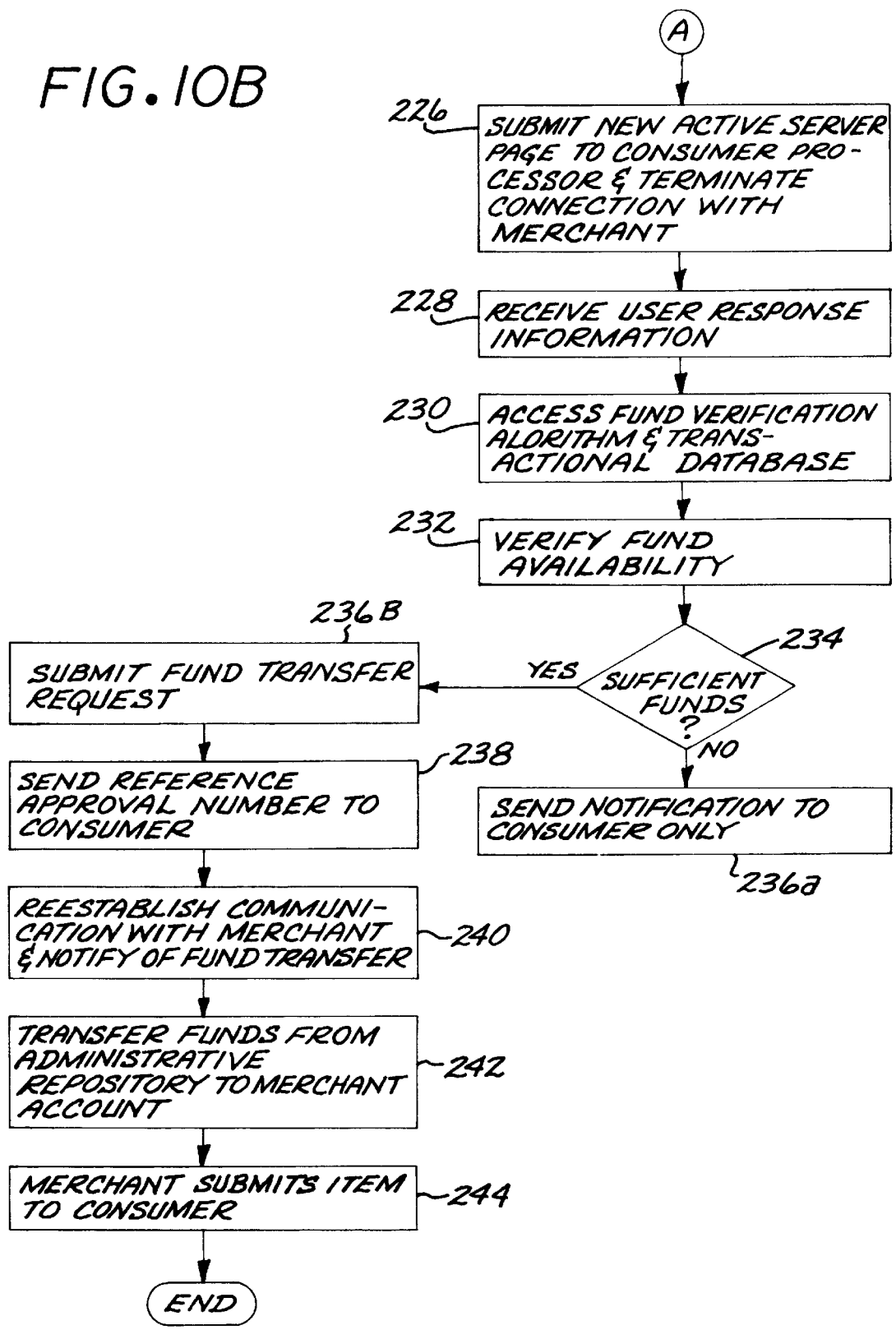

Referring now to FIGS. 1, 10A, and 10B, at step 200, the administrative server 52 operates the transactional program 37 and accesses the new card identifier algorithm 66 to generate a group of unique card identifiers 38. Individual unique card identifiers 38 are imparted onto plastic cards along with an initial balance indicator 61 and contact information 63 to create a plurality of pre-paid cards 34 (FIG. 3). At step 202, the cards 34 are provided at distribution sites 36 in convenient locations. A consumer 31, at step 204, locates a distribution site and exchanges currency in exchange for an unactivated pre-paid card having an associated initial balance 61 equal to the currency submitted. Cards are replenished at distribution sites as the supply runs low. At particular intervals, the currency contained in the distribution sites 36 is collected (step 206) and sent to the administrator's account at the first repository 62. At step 208, the consumer 31 accesses the activation site 42 maintained by the administrative server 52 on the global computer network 32. Activation is a relatively simple procedure aimed at conveniently getting the consumer 31 under way. A preferred approach is for the consumer to access the global consumer network 32 and enter the web address 63 listed on the card. Alternatively, the consumer could call a contact number. Using either approach, the consumer will be prompted with a series of questions. In the case of a web site activation, the administrative server 52 operates the transactional program 37 and accesses the activation algorithm 43 to present the consumer 31 with an Active Server Page requesting information including a unique user identification 80, any unique card identifiers 38, and a password 81. Shipping information 82 such as name 82a, address 82b, city 82c, state or province 82d, zip code 82e, country 82f, daytime telephone 82g, and email address 82h is also typically requested. It must be appreciated, by entering shipping information at this stage, the consumer is saved from having to enter this information on every single transaction and may simply be prompted to verify the accuracy or modify the information if desirable during the actual purchasing stage.

This consumer information is processed by the transactional program 37 which performs several tasks (step 210). First, a user record 44 is created containing the consumer information requested at the activation site 42 and associating the initial balance 61 with the user record. Secondly, an active card status 86 is associated with the unique card identifiers 38 provided thereby activating the pre-paid card. At this stage, the user record contains the unique user identification 80, any related unique card identifiers 38 and associated initial balances 61, password 81, shipping information 82, and an active card status 86. This user record 44 is stored in the transactional database 46. The consumer is now ready to use the pre-paid card 34 to purchase salable items 48 such as goods or services over the global computer network 32.

At step 212, the consumer 31 then uses the communication software and browser maintained on the consumer processor 39 to access a desired merchant web site 40 maintained by a merchant server 41 on the computer network 32. After accessing the merchant web site 40, the consumer proceeds through a selection process to find a desired good or service for which the consumer will use the pre-paid card 34 to purchase. After confirming selection of the desired salable item 48 the consumer proceeds to checkout (step 216) and is presented with at least one purchasing option 50 requesting to use the pre-paid card 34 as the purchasing medium.

At step 218, the consumer elects a pre-paid card purchasing option 50 having a link to the host address on the global computer network 32 to the transactional server 52. Selection of this option 50 submits a host connection request to the transaction server 52 and also transmits a purchase item request 54 including a description of the selected item or items 48 and purchase price 78 to the transaction server 52. The purchasing sequence is now initiated.

At this point, consumer computer 39 will access the transaction server 52 because of the hyperlink embedded in the pre-paid card purchasing option 50 (step 220). Communication is established between the consumer computer 39 and the administrative server 52. Any network communication between the first or third party and the merchant server 41 is terminated. At this point resources provided by the merchant's server are freed. The purchase item request 54 is received by the transaction server 52 which activates the transactional program 37 to access the new page generator algorithm 94. At step 222, the new page generator algorithm accesses the merchant's web display 40 currently being displayed on the consumer terminal. The display code 96 is revealed using conventional programming techniques. All or some of the display features 100 are selected for incorporation into a new substitute display page 102 which is generated. Preferably, a sufficient number of graphical features is chosen. Such new display thus substantially duplicates the merchant's display. A query window is coded into the new display page 102 (step 224). The query window includes a request for a unique user identifier 80, password 81, and the unique card number 38 of the card to be used. Such new display page is an Active Server Page that can receive the requested inputs from the consumer and transmit these responses to the transactional server 52. At step 226, the substitute display page 102 including selected display features 100 and the query window 110 is then sent back to the consumer over the communication channel (FIG. 10B). This process is done rapidly such that the consumer receives little indication, if any, that an alternate server has taken over the purchasing transaction. It must also be appreciated that the merchant's display features and any piggybacked advertising on the new display page 102, which substantially imitates or mimicks the merchant's web page, remain within the view of the consumer throughout this part of the process.

At step 228, the consumer 31 enters the requested information and the transactional server receives the input. The transactional computer program 37 then accesses the fund verification algorithm 76 (step 230). The fund verification algorithm first accesses the transactional database 46 and searches for the user record 44 associated with the consumer input unique user identifier 80. The card status 86 associated with the consumer input unique card number 38 is checked for an active indication. For purposes of this example, it will be assumed the consumer has provided a unique card identifier with an active status. Should an inactive status be discovered, a message will be sent to the consumer requesting another unique card identifier. The unique card number 38 is then checked to see if it corresponds to the unique user identification 80 which advantageously adds a layer of security to the process. At step 232, the particular user record 44 is then read and the current balance 65 associated with the consumer input unique card number 38 is compared with the purchase price 78 to verify sufficient funds available to complete the purchasing transaction.

A decision is made in step 234. If the transaction is not viable, that is, there are insufficient funds to cover the purchase price, then a negative preformatted notification 88 is sent to the consumer 31 indicating insufficient funds and requesting an alternative unique card number 38. The current balance 65 of the related user account 44 will not be debited but a log of invalid transactions may be kept. Advantageously, communication with the merchant server is not reestablished since the transaction is invalid yet the merchant's site and any piggybacked advertising is kept in the consumer's view at all times. Thus valuable computer and network resources are freed for other work. At the same time, the merchant's server is relieved from the resource drain caused by waiting for a transaction to be processed. Advantageously, this relieves the merchant's server, which may be supplying information to a large number of consumers, of handling invalid transactions. Since the merchants are not notified of the invalid transactions, it prevents them from building a rejection log for particular customers which may add a level of privacy for the consumer.

If, however, the transaction is viable, that is, there are sufficient funds to cover the purchase price, then the current balance 65 in the user account is debited and a new balance associated with the unique card number is stored in the transactional database 46 in the user record 44. A fund transfer request 98 is submitted to the administrative repository 62. A preformatted successful notification 88 is also generated. Such transaction message includes a transaction reference number 92 or identifier. This identifier may be used to assist customer service and provide proof of a valid transaction. The successful notification is then returned to the consumer 31 (step 238). Additionally, communication is reestablished with the merchant 33 and the administrative server 52 submits the positive notification 88 to the merchant server along with the shipping information 82 (step 240). The consumer is then returned to the control of the merchant server for continued browsing, if desired.

As indicated in step 242, following the submission of the fund transfer request 98, funds equal to the purchase price 65 and any associated fees are transferred from a temporary repository 62 to the merchant's associated repository 64, which may or may not be the same financial institution. The transfer may be via any conventional means commonly used in the banking industry such as wire transfer, electronic check, or mail.

The merchant then forwards the selected item 48 using conventional shipping techniques to the shipping address 82 provided by the transactional server to complete the purchasing transaction. Advantageously, the pre-filled in shipping address 82, saves time for each transaction, and less resources are required by the merchant. In either situation, it must be appreciated that the merchant and any piggybacking advertisers get the benefit of additional display time in front of the consumer.

Several other features lends themselves to the invention described herein. In some cases, it may desirable to transfer a current card balance 65 from one pre-paid card 34 to another possessed by someone having the same unique user identification 80, commonly called piggybacking. In such a case, the consumer 31 could merely access the activation site and through a series of prompts input the unique user identification and the corresponding unique card identifiers. The accounting database 46 is then accessed and one balance is transferred to another. The remaining card is given a zero balance and may be placed on the inactive card list.

Within this framework, a transfer could be performed between one user and another. The user desiring to transfer finds to another card carrier merely needs to access his own account using the password 81 via the activation site 42 and when queried provide the unique user name 80 of the party that will receive the finds. The administrative database debits the first card in the amount chosen and credits the receiving party's account. All user records 44 are updated to reflect the new values.

While the use of the pre-paid card provides benefits not necessarily available through a credit card, it is possible that a credit card could be used to recharge the balance on a pre-paid card. The consumer merely relays the necessary credit card information to the activation site administrator who then adds a corresponding balance to the card and updates the accounting database. By way of example, this step would allow a parent to provide a pre-determined amount of finds to a child for Internet shopping without providing them with the actual credit card which may have a larger balance than the parent wishes to provide.

In addition to restricting the cash limit associated with the pre-paid card 34, an additional embodiment of the present invention includes a use restriction or exclusionary function prohibiting the purchase of certain categories of salable items 48 or the purchase of salable items from selected merchants. Upon entering the activation site 42, the consumer 31 activating the pre-paid card 34 may be provided with a listing of categories of salable items or particular salable items. The consumer 31 may select particular categories indicating either approved for use with the pre-paid card or alternatively not approved for use with the pre-paid card. For example, a parent may purchase a pre-paid card 34 and, upon accessing the activation site 42, select a category entitled school books. In this manner, the activator of the card, in this case the parent, may indicate that this pre-paid card is only to be used for purchasing text books. Such selection will be stored in the user record 44. Alternatively, during the activation process, one or more categories of goods may be excluded or prohibited whereby the pre-paid card could be used for the purchase of any goods except those specifically excluded. Thus, by way of example, a parent could exclude alcoholic products or "adult" material products from items which may be purchased.

After the consumer 31 selects the pre-paid card option 50 as described hereinabove, a description of the selected salable items 48 is sent along with the purchase item request 54 to the administrative server 52. The user record 44 is accessed and the description is then compared to the pre-stored categories in the user record. If the description does not fall in a prohibited category, then the transaction is allowed to proceed as described herein. If the description does fall in a prohibited category, then a message is sent to the consumer 31 stating that prohibited goods have been selected. In a similar manner, the consumer may be prompted at the activation site 42 for particular merchants to prohibit purchases therefrom. The prohibited merchant list would also be stored in the user record 44 to be recalled for comparison during the actual purchasing transactions.

This exclusionary feature provides a level of control over the purchasing practices of the beneficiary of the pre-paid card. In practice, a parent could purchase the pre-paid card and activate the card using an activation password. Any salable items or merchants to be prohibited are selected as desired. Any associated user names, such as the prospective pre-paid card beneficiary, can be linked to the unique card number 38 and stored in the user record 44 along with the prohibited items or merchant selections. A second password to be used for purchasing items is then selected. The parent is the keeper of the activation password which enables the parent to change the prohibited goods as desired. The second purchasing password will not allow the pre-paid card to change the prohibited items list but will allow otherwise normal purchasing transactions by any party having a user name stored in the user record as described herein.

Another practical example of the exclusionary feature is its incorporation into the government issuance of social assistance funds to recipients. The requisite government branch submits the social assistance funds to the administrative repository 62 and sets up a pre-paid card account 44 for the recipient 31 at the activation site 42 using an activation password. Any desired prohibited items or merchants are selected and stored in the recipient account 44. The social assistance recipient is then issued the pre-paid card 34 and a transaction password 81 to purchase non-restricted items in the manner described herein.

In addition to retrieving the display code 96 from the merchant or consumer processors, another alternative would be to partially overlay the merchant's display with a pop up window having the query form 110. The query window is positioned to cover only a portion of the merchant's display and thus most of display features would be shown outside the border of the query window in the background.

Conveniently, the purchasing could be initiated at the activation site 42. Links to merchants could be supplied at the activation site so that consumers 31 could immediately access merchants 33 after activating their cards 34. Such provision would save consumers time by avoiding a search for merchants accepting the pre-paid card option 50.

While several forms of the present invention have been illustrated and described, it will also be apparent that various modifications may be made without departing from the spirit and scope of the invention.

What is claimed is:

1. A method for handling a purchasing transaction between a first party using a first party processor and a second party using a second party processor communicating over a global computer network and comprising the steps of:

generating a plurality of pre-paid cards in an unactivated state, each card having a unique card identifier;

providing said cards at a distribution site;

exchanging currency received from the first party at said distribution site for at least one pre-paid card;

collecting the currency from said distribution site and depositing the currency in a first repository;

activating said pre-paid card at an activation site by requesting and receiving a set of first party information;

generating a user record based on said first party information and storing said record in a transactional database maintained by a third party administrator;

accessing a merchant site having a merchant display generated by a display code capable of displaying a plurality of graphical features including salable items via the global computer network;

selecting and confirming at least one salable item to be purchased;

presenting the first party with a pre-paid card purchasing option having an associated link;

selecting said pre-paid card purchasing option;

accessing a third party administrative processor including a transactional computer program having a new page generating algorithm and a fund verification algorithm;

initiating said new page generating algorithm to obtain said display code and reconfigure said code to generate a new display page in the form of an active server page including a query form requesting user response information and a selection of said graphical features;

forwarding said new display page to the first party processor and terminating communication with the second party;

receiving said requested user response information;

accessing said fund verification algorithm and said transactional database to verify the viability of the transaction;

if such transaction is viable, submitting a fund transfer request to said first repository to transfer funds to a second repository associated with the second party;

sending a reference approval number to the first party;

reestablishing communication with the second party and sending a notification of said fund transfer request; and forwarding said selected salable item from the second party to the first party.

2. A system for handling a purchasing transaction as set forth in claim 1 wherein:

if such transaction is not viable, sending notification to the first party.

3. A method for handling a purchasing transaction between a first party having a first party processor and a second party having a second party processor communicating over a communications network and comprising the steps of:

providing a plurality of pre-paid cards for exchange at a distribution site in an unactivated state, each said pre-paid card having a unique card identifier;

activating said pre-paid card at an activation site upon requesting and receiving a set of first party information;

generating a user record based on said first party information and storing said record in a transactional database;

establishing communication with a second party processor and displaying on a first party display device a second party display generated by a display code capable of generating a plurality of media features including salable items via the communications network upon receiving a request from said first party for a second party display;

upon receipt of a selection of at least one salable item to be purchased, transmitting a pre-paid card purchasing option having an associated link to said first party processor for display on said first party display device;

upon receipt of the selection of said pre-paid card purchasing option, accessing an administrative processor including a transactional computer program having a new page generating algorithm and a fund verification algorithm and initiating said new page generating algorithm to obtain said display code and reconfigure said code to generate a new display page in the form of an active server page including a query form requesting user response information and a selection of said graphical features;

forwarding said new display page to the first party processor for display on said first party display device and terminating communication with the second party processor;

upon receipt of said requested user response information, accessing said fund verification algorithm and said transactional database to verify the viability of the transaction;

if such transaction is viable, submitting a fund transfer request to a first repository associated with said first party to transfer funds to a second repository associated with the second party;

reestablishing communication with the second party processor and sending a notification of said fund transfer request; and forwarding said selected salable item from the second party to the first party.

4. A system for handling a purchasing transaction as set forth in claim 3 wherein:

if such transaction is not viable, sending notification to the first party.

* * * * *

UNITED STATES PATENT AND TRADEMARK OFFICE
CERTIFICATE OF CORRECTION

PATENT NO. : 6,505,171 B1
DATED : January 7, 2003
INVENTOR(S) : Robert H. Cohen, Jeffrey Charles Marder and John Clayton Hilinski It is certified that error appears in the above-identified patent and that said Letters Patent is hereby corrected as shown below:

<u>Column 12,</u>
Lines 37, 40 and 52, replace the word "finds" with -- funds --

Signed and Sealed this

Eighteenth Day of March, 2003

JAMES E. ROGAN
*Director of the United States Patent and Trademark Office*